B. R. JACKSON.
WIND SHIELD.
APPLICATION FILED MAR. 27, 1918.

1,292,610.

Patented Jan. 28, 1919.
2 SHEETS—SHEET 1.

B. R. Jackson, Inventor

Witness

By C. A. Snow & Co.
Attorneys

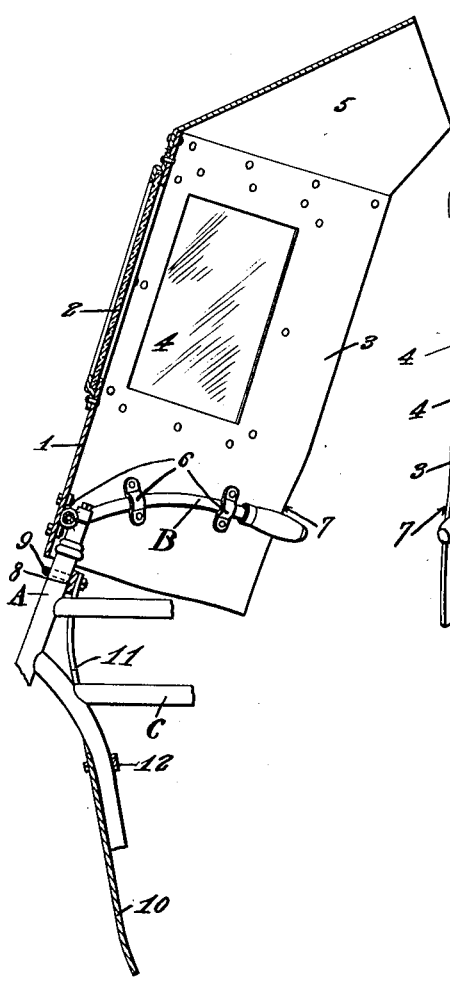
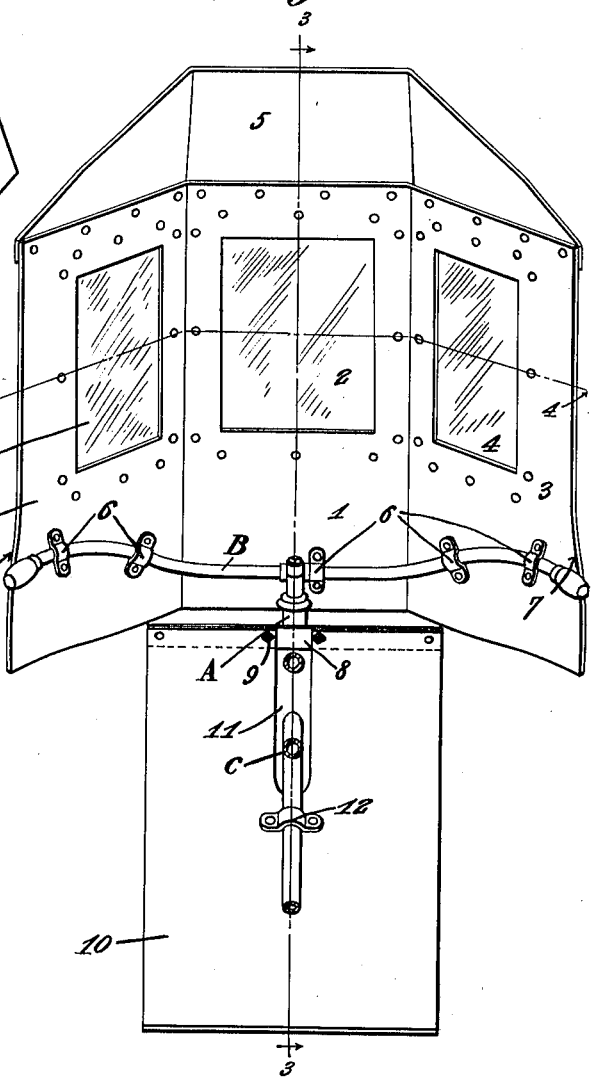

UNITED STATES PATENT OFFICE.

BERT R. JACKSON, OF PENDER, NEBRASKA.

WIND-SHIELD.

1,292,610.

Specification of Letters Patent.

Patented Jan. 28, 1919.

Application filed March 27, 1918. Serial No. 225,012.

*To all whom it may concern:*

Be it known that I, BERT R. JACKSON, a citizen of the United States, residing at Pender, in the county of Thurston and State of Nebraska, have invented a new and useful Wind-Shield, of which the following is a specification.

This invention relates to wind shields especially adapted for use upon motor cycles, one of its objects being to provide a substantial structure which can be applied readily to a motor cycle and which will protect the driver from the wind, dust, rain, etc., so that the machine can be used with some degree of comfort in disagreeable weather.

A further object is to provide a wind shield which will afford protection for the legs of the driver as well as for the upper portion of the body, the device, however, in no way interfering with the operation and control of the motor cycle.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings

Fig. 2 is an enlarged rear elevation of the wind shield, a portion of the motor cycle to which it is attached being shown.

Fig. 3 is a section on line 3—3, Fig. 2.

Figure 1:
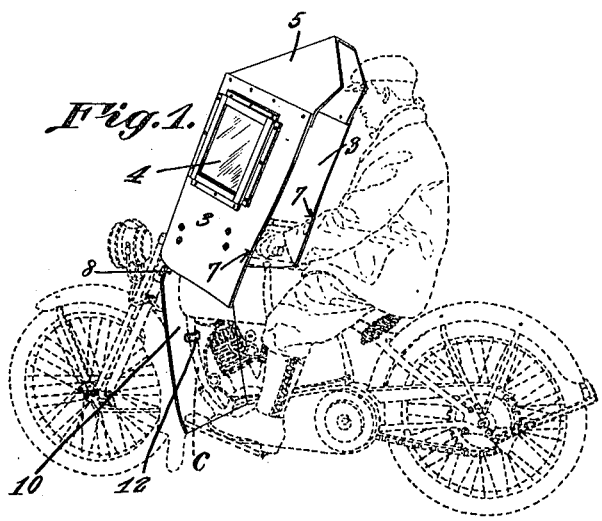
Figure 1 is a perspective view of the device in position upon a motor cycle which is shown by dotted lines.
Figure 4:
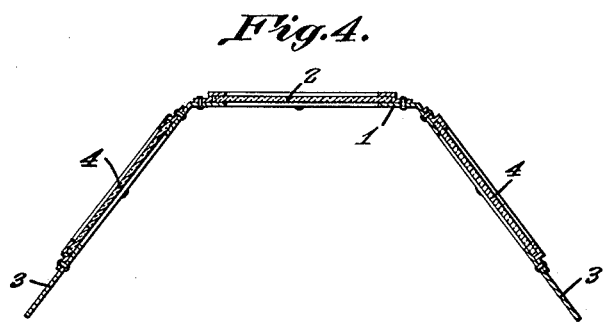
Fig. 4 is a section on line 4—4, Fig. 2.

Referring to the figures by characters of reference, A designates a portion of the steering head of a motor cycle and B designates the handle bars. The frame of the motor cycle has been shown at C. The wind shield constituting the present invention includes a front wall and side wings, the front wall 1 being made preferably of sheet metal and having a window 2 therein while the side wings 3 are likewise preferably made of sheet metal and have windows 4. The wings 3 diverge rearwardly and the upper edges thereof are secured to a hood or cover 5 of sheet metal and which extends upwardly and rearwardly from the front wall 1. The front wall 1 is preferably extended upwardly along lines parallel with the steering head A so as thus to be inclined as shown in Fig. 3 and as the hood 5 extends upwardly and rearwardly from this wall 1, a recess is thus provided for receiving the body of the driver of the motor cycle. The parts are held in the desired position relative to the frame of the motor cycle by clips 6 which are bolted to the wall 1 and the wings 3 and engage the handle bars B as shown. The lower portions of the wings 3 are bent or offset laterally at their rear ends, as shown at 7, thus to permit the grips on the handle bars to be grasped readily.

A cross strip 8 is extended back of and in contact with the upper portion of the steering head and is fastened thereto by a U-bolt 9. To this strip is secured the upper end of a shield plate 10 provided for the legs of the rider and which has a slot 11 extending downwardly thereinto from its upper end. The front portion of the frame C extends into this slot and the lower portion of the plate is secured to the frame in any manner desired, as by means of a clip 12. The plate is adapted to extend down to points in front of and close to the foot rests of the motor cycle and is sufficiently wide to afford ample protection for the legs.

When the device is in use the rider operates the machine as ordinarily and the upper portion of his body will extend into the space between the upper wings 3 while the legs will be back of the plate 10. When the handle bars are turned in steering, the upper portion of the shield will turn therewith so as thus to be dead against the wind at all times.

It will be apparent that the shield can be applied readily to machines already in use and is not heavy, unsightly or unwieldy.

What is claimed is:—

1. A wind shield for motor cycles comprising a front wall, rearwardly diverging side wings, windows in said wall and wings, a hood connecting the upper ends of the wall and wings, means for supporting the wall and wings in an upwardly and rearwardly inclined position upon the handle bars of a motor cycle, a cross strip below and back of the front wall, means for attaching it to the steering head of a motor cycle, and a shield plate depending from the cross strip for embracing the front portion of a motor cycle frame.

2. A device of the character described including a cross strip for attachment to the steering head of a motor cycle, a shield plate depending therefrom and having a slot for the reception of the front portion of the frame of a motor cycle, a front plate above and in front of said shield plate, side wings diverging rearwardly from the front plate, a hood connecting the wings and front plate, and means for securing the wings and front plate to the handle bars of a motor cycle and in an inclined position.

In testimony that I claim the foregoing as my own I have hereto affixed my signature in the presence of two witnesses.

BERT R. JACKSON.

Witnesses:
 E. T. CRELLIN,
 J. E. WELLING.